United States Patent [19]

Hubbard

[11] 4,268,724

[45] May 19, 1981

[54] CONTINUOUS TIMED SEGMENT BROADCAST RECORDER SYSTEM

[76] Inventor: William Hubbard, 1906 Kanawha Ave., Dunbar, W. Va. 25064

[21] Appl. No.: 48,302

[22] Filed: Jun. 13, 1979

[51] Int. Cl.³ .................................... G11B 31/00
[52] U.S. Cl. ................................. 369/7; 360/7; 360/137; 360/72.1
[58] Field of Search .......... 179/100.11, 100.1 C, 179/100.1 PS; 360/5, 7, 12, 137, 33; 358/127

[56] References Cited

U.S. PATENT DOCUMENTS

| | | | |
|---|---|---|---|
| 2,097,901 | 11/1937 | Thomas | 179/100.11 |
| 2,380,392 | 7/1945 | Begun | 360/7 |
| 2,385,701 | 9/1945 | Halstead | 360/7 |
| 3,538,265 | 11/1970 | Keeler | 179/100.11 |
| 4,031,334 | 6/1977 | Kimura et al. | 179/100.11 |
| 4,049,169 | 9/1977 | Houf, Jr. | 179/100.11 |
| 4,109,115 | 8/1978 | Yamamoto | 179/100.11 |

*Primary Examiner*—Raymond F. Cardillo, Jr.
*Attorney, Agent, or Firm*—Jones, Tullar & Cooper

[57] ABSTRACT

A small continuous loop tape recorder is connected to receive audio signals from a broadcast receiver, and a timer is provided to activate the recorder at intervals to record selected broadcast events. A mechanism is provided to manually activate the playback portion of the recorder whereby a previously recorded event is played back at a desired time. The receiver may be an integral part of a self-contained broadcast recorder unit, the receiver may be a conventional AM or FM broadcast receiver to which the recorder unit is connected, or there may be a combination of a self-contained receiver-recorder unit with a conventional broadcast receiver.

13 Claims, 3 Drawing Figures

CONTINUOUS TIMED SEGMENT BROADCAST RECORDER SYSTEM

BACKGROUND OF THE INVENTION

The present invention relates, in general, to apparatus and circuitry of selectively recording radio broadcast events and for playing back the most recently recorded event upon command. More particularly, the invention relates to a timed broadcast recorder system utilizing a continuous loop tape recorder and playback unit connected to a broadcast receiver and periodically activated by a timer to record pre-selected broadcast events, and further relates to control means for playing back the recorded events upon command. The receiver portion of the system may be an AM radio receiver, an FM radio receiver, a shortwave communications receiver, or the like, and the timer may be set to operate the tape recorder and receiver periodically, for example, once each hour, to receive and record the hourly news which is broadcast on a selected station or to record some other preselected periodic event. The device may be a self-contained unit, or may be connected in combination with existing receiver units.

Although hourly news broadcasts were common on almost every radio station in years, past, in the last decade many stations have shown little interest in news programming, preferring instead to shift to a continuous music format. Similarly, many television stations carry no news programming at all, although major TV stations broadcast world news in the early morning hours, around the dinner hour, and late in the evening with an occasional one-minute update throughout the day. Thus, during the bulk of the day, news programs are hard to find and are generally restricted to short hourly broadcasts on selected AM network stations and on a few FM stations.

Many people, however, wish to keep up to date on the news, particularly at times of major happenings or emergencies. Because of the low number of stations which carry such broadcasts, and the relative scarcity of such broadcasts, it is often difficult to remember to turn on the radio at the proper time and then to find the correct station. Often times during the day it is simply not convenient to break away from an appointment, business conversation, telephone call or the like just to turn on the radio to hear the latest news, even though at times of emergencies such as floods, hurricanes or the like getting the news as soon as possible may be of major importance. Furthermore, it often happens that during a news broadcast, one's attention is diverted momentarily so that important information is missed, and the listener must then wait until the next broadcast, perhaps an hour later, to obtain the required information. Other periodically broadcast information, such as farm reports, stock market reports, or the like may be the events of interest instead of news broadcasts, or, in the case of shortwave communications, the events of interest may be periodic instructions to security officers, emergency information for police and fire officials, or the like. Thus, it will be understood that references herein to news broadcasts includes such other events.

SUMMARY OF THE INVENTION

The present invention overcomes the problems outlined above by the provision of a small, continuous loop tape recorder which is activated periodically by a timing mechanism such as a solid state timer, the clock in a clock radio, or the like. The recorder is activated to receive and record, for example, the hourly news each and every hour from a broadcast receiver which, in one form of the invention, is built into the unit of the present invention and is thus integral with the recorder. Whenever the recorder is not operating to record a broadcast it is available for playback of the most recently recorded segment so that the user may at any time press the playback button of the recorder and receive the most recent news broadcast.

In the form of the invention wherein the unit comprises an integral receiver and recorder, the receiver is pre-tuned to the frequency on which the news program will be broadcast, and the timer mechanism turns the radio and recorder on at the desired time, records the program, and turns the unit off.

In other embodiment of the invention, the receiver and recorder unit may be incorporated in or combined with another receiver unit such as an AM/FM clock radio which could be tuned to any desired station for normal listening. The news recorder unit would, however, remain operative to record the news broadcast from the selected station at the same time that the clock radio is playing on another station. Whenever desired, then, the clock radio may be interrupted and the news broadcast played back from the recorder. In similar manner, the news recorder unit may be incorporated in a television set to automatically record news broadcasts that could be played back during breaks in the television programming.

The present invention discloses control circuitry for automatically recording news programs at pre-selected times and for permitting the recorded material to be played back at any time it is desired. The circuitry even permits simultaneous listening and recording so that news can be heard directly from the receiver as it is being recorded, thereby providing a record of the received information that will enable the listener to immediately play back the program to insure that he did not miss any information or to allow him to reconfirm details of the information provided. Although the recording function is automatic, and the playback is manually activated, the control circuit also provides a stop function and a pause function which override the usual operations. The stop function switches operates when the recorder is in its playback mode to stop the playback and return the system to the record mode. The pause mode is operable when the system is in playback mode to stop the playback and hold the unit in the playback mode, so that when the pause switch is released, the unit resumes playing back from where it had been held. In the pause mode, the recorder does not automatically shift to the record mode.

BRIEF DESCRIPTION OF THE DRAWINGS

The foregoing and additional objects, features and advantages of the present invention will become evident to those skilled in the art from a consideration from the following detailed description thereof, taken in conjunction with the accompanying drawings, in which.

DETAILED DESCRIPTION OF PREFERRED EMBODIMENTS

Figure 1:
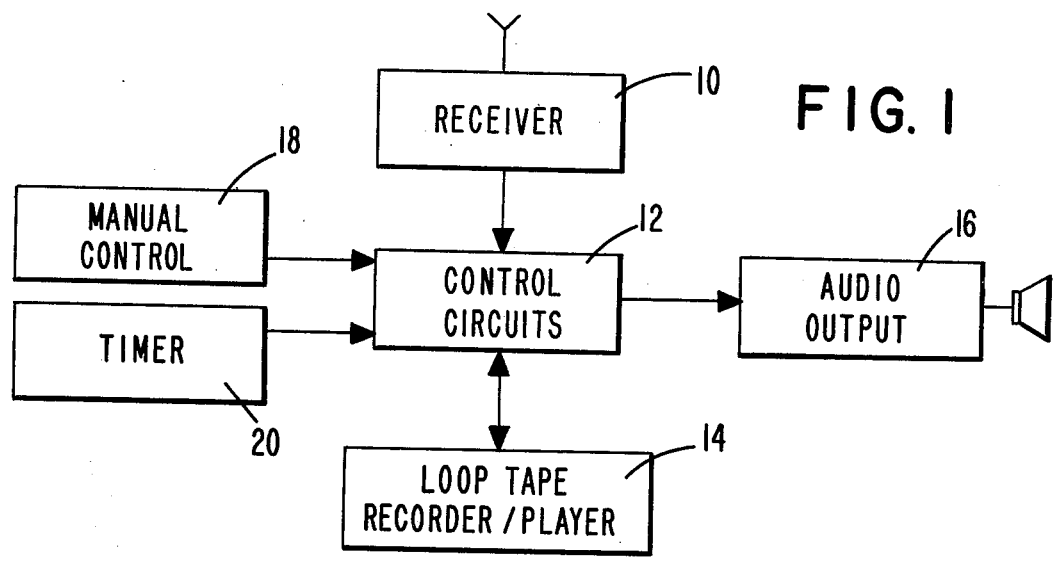
FIG. 1 is a general block diagram of timed interval receiver and recorder system in accordance with the present invention.

Turning now to a more detailed consideration of the drawings, there is illustrated in FIG. 1 a receiver 10 connected by way of control circuits 12, to be described, to a loop type tape recorder and player unit 14. The control circuits 12 include suitable relays and switching to permit connection of the receiver audio frequency output to the tape recorder for recording, for connection of the tape unit in its playback mode to an audio output 16 and for connection of the receiver 10 to the audio output, as desired. Manual control switching 18 and a timer mechanism 20 permit operation of the control circuits in the selected manner to perform the functions as outlined above.

The receiver 10 may be any suitable AM, FM or communications receiver tunable to a selected station to receive the broadcast information that is to be recorded. Thus, the receiver may, in its preferred form, be a conventional AM receiver selectively tuned to a station which periodically broadcasts news programs that are to be recorded. The timer 20 is an adjustable clock mechanism which may be used to turn the receiver and/or the tape recorder on at selected times for recording of received broadcasts such as hourly news programs. The timer 20 is activated periodically to record only the selected programs and the tape recorder includes a continuous, repeating loop which is sufficiently long to receive the desired program. Thus, for example, if it is desired to record hourly five-minute news broadcasts, a five-minute tape loop would be provided and the timer would turn the receiver and recorder on each hour on the hour and turn them off after five minutes so that the recorder would be updated each hour with the latest news broadcast.

The manual control switching 18 includes a playback switch for permitting the user of the system to turn the tape recorder on at any time to listen to the most recently recorded news broadcast. If the control circuitry should be turned on at a time when a program is being recorded, the control circuitry will continue to record the program, but will also transmit the signals being recorded to the audio output so that user may listen to the information as it is being recorded. At the end of the program, the entire program will be on the tape, and it can be replayed as desired. Again, although the invention is described in terms of periodic news broadcasts, it will be apparent that other types of broadcast programming or information may be recorded, as desired.

Figure 2:
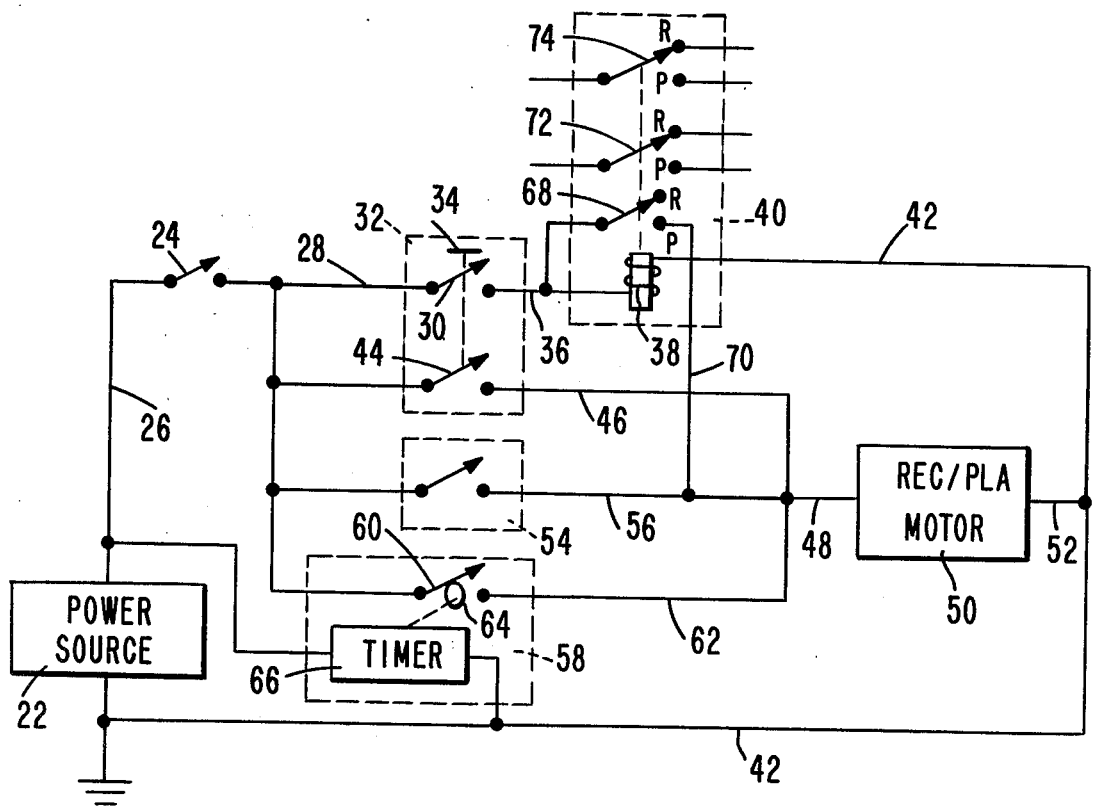
FIG. 2 is a diagrammatic illustration of a control circuit for use with the system of FIG. 1.

Many of the control circuits which are utilized in operating the system of the present invention are illustrated in greater detail in FIG. 2, in combination with the manual control and timer units, and reference to this figure is now made. The control circuitry is connected across a suitable power source 22 which may be a conventional alternating current source or, where the unit is to be installed in an automobile or is for other mobile use, the power source may be a battery pack. One side of the power source is connected to one side of an on-/off switch 24 by way of line 26, the other side of switch 24 being connected by way of line 28 to a first, movable, normally-open contact 30 of a double-pole, single-throw, spring return playback switch 32 that is manually activated by a push-button 34. When closed, the first contact 30 connects line 28 to line 36 which leads to the solenoid winding 38 of a mode shifting switch, which may be a control relay, 40, and thence by way of line 42 to the other side of the power source, which may be a ground reference.

The second normally open contact 44 of playback switch 32 connects line 28 by way of lines 46 and 48 to one side of the recorder unit drive motor 50, the other side of which is connected by way of line 52 to the ground line 42.

Connected in parallel with contact 44 of the playback switch 32 is a tape controlled switch 54 which is responsive to the continuous loop tape in the recorder 14. Switch 54 is normally open, but closes to connect line 28 to line 56, and thence to line 48, when the tape recorder is turned on and the tape loop starts to move, and remains closed as long as there is tape available in the loop. When the loop has been completely played and returns to its starting point, the connection between lines 28 and 48 is broken by the opening of switch 54.

A third parallel path between lines 28 and 48 is provided by way of timer switch 58 which is shown as including a movable contact 60 which connects line 28 by way of line 62 to line 48. Contact 60 may be driven by an eccentric cam 64 which is, in turn, operated by a mechanical timer 66 or its equivalent, and which may be connected across the power source 22. Preferably, the timer is adjustable to operate periodically to close contact 60, and in the example discussed herein, the timer would operate every hour on the hour to close contact 60 for a brief period to activate the recorder motor 50, thereby loving the tape to close switch 54 to hold the recorder on for the time required to complete the loop.

Control relay 40 is illustrated as having at least three movable contacts, each of which is adapted to shift from a first position which is illustrated in FIG. 2, to a second position upon energization of solenoid 38. The illustrated position is the record mode of the control circuit, while the second position is the playback mode which occurs when the solenoid is energized by the operation of the playback control switch 32. Movable contact 68 in the control relay 40 is connected at one side to line 36 and at the other side by way of line 70 to line 56. This contact serves to seal in the solenoid 38 when the tape recorder is operating, for at such time the tape switch 54 is closed and the positive side of power source 22 is connected by way of switch 24, line 28 and contact 54 to line 56. The positive voltage on line 56 is then fed through the relay solenoid 38 to ground line 42, thus bypassing switch 32 and holding the relay energized until the end of the tape loop.

When solenoid 38 is energized, it shifts relay contacts 72 and 74 which serve to control the operation of the receiver/recorder system. Thus, switch 72 normally connects the audio output of receiver 10 (FIG. 1) directly to the audio output stage 16 so that whatever is being received will be connected to the radio loudspeaker. The output of the receiver is also connected to the audio input of the tape recorder and switch 74 in its normal position holds the tape recorder in its record mode so that the receiver output is recorded whenever the tape unit is activated. Thus, if desired, the user can listen to the material being received at the same time that it is being recorded.

If the received and recorded programming is missed by the user, or if the user wishes to hear it over again, it is only necessary to press the replay button 34, activating the solenoid 38 and shifting the system to the playback mode. This activates the tape recorder unit, causing the tape to advance and close switch 54, the closure of this latter switch sealing in solenoid 38 to hold the system in the playback mode. The shifting of contact 72 to the playback mode connects the output of the tape recorder 14 to the audio output 16, and whatever is recorded is then played back through the loudspeaker. At the conclusion of the tape, switch 54 opens, and since switch 32 is a momentary switch which returns to its open position as soon as it is released, the relay 38 is de-energized and the system returns to its record mode.

When the receiver/recorder unit of the present invention is a self-contained unit, with the receiver made integral with a tape recorder, the receiver portion becomes the primary receiver of the unit. In this arrangement, the receiver would normally be off, but tuned to a desired station, and would be turned on by the timer with the tape recorder when recording is desired. Alternative switch means can be provided to turn the receiver portion on separately, if desired. Such a unit is described with respect to FIGS. 1 and 2, and may be a portable, battery-operated unit adapted to be carried on the person of the user, or connected in a vehicle, or the like. Such units may be constructed for connection in an existing radio receiver, television set, or the like, where the radio or television provides the primary broadcast reception, and where the receiver portion of the present invention is auxiliary to the primary use of the equipment. In such a case, the primary receiver may be used in its normal way to provide background music, or to provide entertainment, and the auxiliary unit will function as described above to periodically receive and record desired events such as news broadcasts. When convenient to the user of the device, the receiver/recorder of the invention can be activated as described above to cut off the primary receivers and provide a playback of the recorded information.

Figure 3:
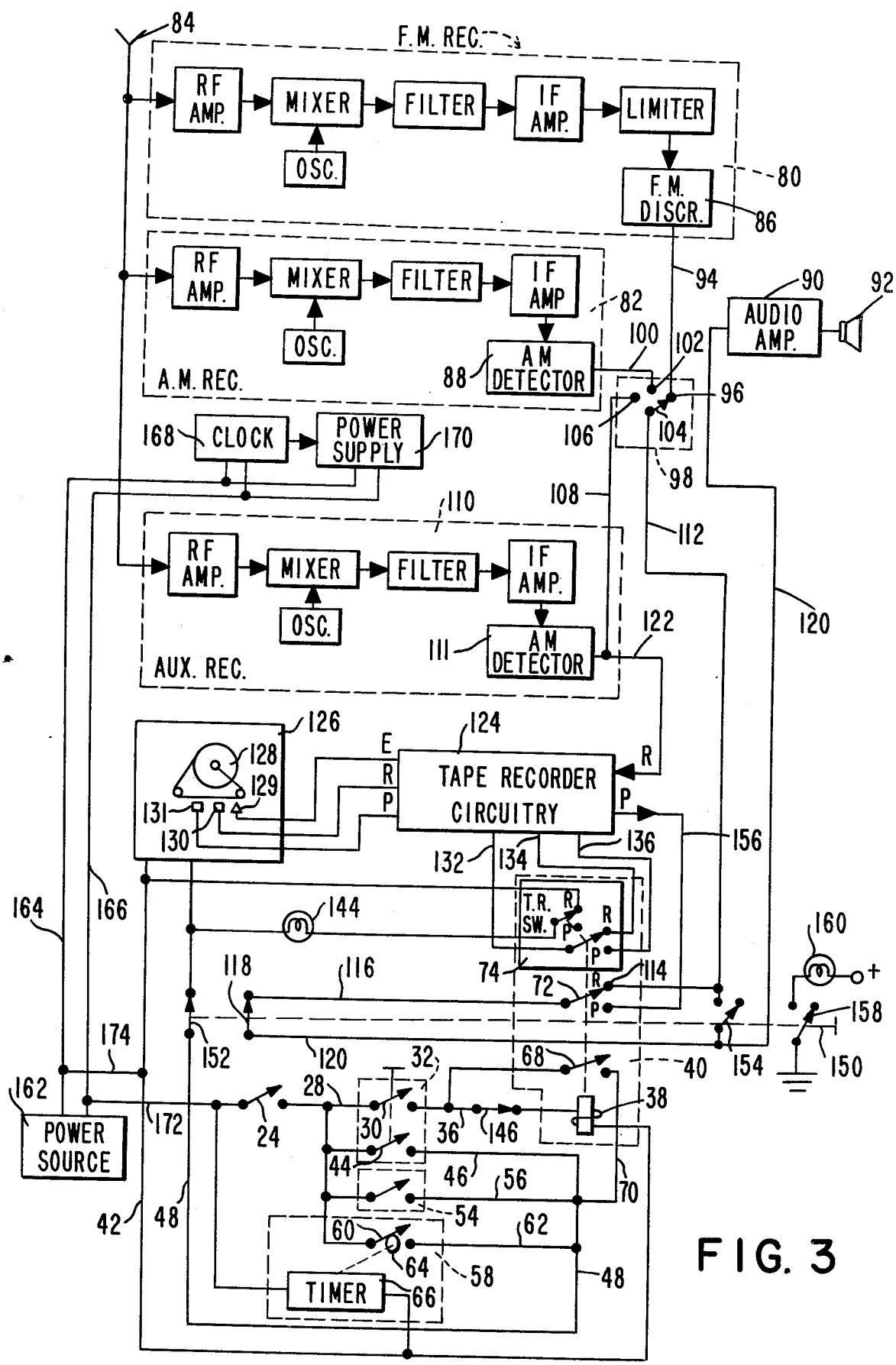
FIG. 3 is a diagrammatic illustration of the system of the invention in combination with a conventional clock radio.

One example of the application of the device of the invention as an auxiliary unit is illustrated in FIG. 3, wherein the unit is connected to a conventional clock radio. As diagrammatically illustrated, the clock radio includes a primary FM receiver section 80 and a primary AM receiver section 82 receiving their inputs from a common antenna 84 and being operable in conventional manner. The construction of the FM and AM receivers is conventional, and needs no further description. The output of the FM discriminator circuit portion 86 of the FM receiver and the output of the AM detector 88 of the AM receiver portion normally are selectively fed to a common audio amplifier 90 which supplies its output to a loudspeaker 92. However, in accordance with the present invention, these outputs are modified by connecting the output line 94 from FM discriminator 86 to a first terminal 96 of a receiver source selector switch 98 and by connecting the output line 100 from AM detector 88 to a second contact 102 of that switch. A movable contact 104 of the switch selects either the AM or the FM receiver for connection to the audio amplifier or, in the alternative, permits the selection of a third contact 106 which is connected to the detector output line 108 from an auxiliary receiver 110, which may be the receiver 10 of FIG. 1. Receiver 110 is shown diagrammatically as being an AM receiver connected to antenna 84 and having a detector portion 111, the output of which is connected to the receiver source selector switch 98.

Movable contact 104 of switch 98 is connected by way of line 112 to the terminal 114 of relay 40 which is normally contacted by movable switch arm 72. Arm 72 is connected by way of line 116, switch arm 118 (to be described) and line 120, which leads to audio amplifier 90. Thus, when selector switch 98 is in contact with contact 96, the output of the FM receiver will be fed to the audio amplifier 90, as long as relay 40 remains de-energized and switch 118 remains closed. In similar manner, the output of the AM receiver 82 or the auxiliary receiver 110 can be selected 98 for connection to the audio amplifier. This latter connection is provided to enable the user to connect the output of auxiliary receiver 110 to the audio amplifier so that the user can listen to that receiver and tune it to the desired station.

The output from the AM detector portion 111 of the auxiliary receiver is also connected by way of line 122 to the record input (R) of the tape recorder circuitry 124. This circuitry is a part of a conventional, commercially available tape recorder and thus requires no further description. It will be noted that the tape recorder includes a tape transport mechanism 126 which, again, is a conventional unit and which incorporates an endless tape reel 128. The recorder may include erase, record and playback heads 129, 130 and 131 connected to the recorder circuitry 124 in conventional manner. The taper recorder is switchable between its record and playback modes by means of one or more switches generally indicated by switch 74 operated by the relay 40, as previously discussed. The tape recorder circuitry may be connected to the recorder switching mechanism 74 by way of suitable connections diagrammatically indicated by lines 132, 134, and 136.

The control circuitry of the unit illustrated in FIG. 3 incorporates the playback switch 32, the tape switch 54 and the timer switch 58, discussed with respect to FIG. 2 and connected by way of lines 42 and 48 to the drive motor of the tape recorder mechanism 126. Again, the sealing contact 68 serves to hold the relay 38 in its energized condition once it has been activated by the playback switch 32.

In the device of FIG. 3, two additional swiches have been provided for more complete control of the unit. One is a pause control and the other is a stop circuit, both of which may be utilized during playback. In addition, a recording light 144 is provided in series with the tape switch 54 and is energized when the tape motor is operating.

The stop circuit for the system of FIG. 3 consists of a stop switch 146 connected in line 36 to contact 68 at relay 40 to line 70 line 56 to tape switch 54 line 28 switch 24 to power source. Switch 146 is normally closed and thus allows relay 38 to be energized upon closure of playback switch 32. However, if stop switch 146 is momentarily opened it will release coil 38 and shift the system out of the playback mode, back to the record mode. The system will then remain in the record mode until the playback switch is operated.

The pause circuit comprises a four-pole pause switch 150 which is of the push-to-open and push-to-close type. This switch is designed to stop the playback of the tape recorder without releasing the relay 40 so that the playback can be resumed at a later time. Switch 150 includes the contact 118 previously discussed, and also includes contact 152 which is connected in the motor circuit line 48 to de-energize the tape recorder motor. Switch 150 also includes a contact 154 connected between lines 112 and 120 to bypass relay contact 72 and thereby connect the output of the selected one of receivers 80, 82 and 110 to the audio amplifier. This restores the programing source to the primary radio receivers during the pause operation. At the same time, switch contact 118 opens to block the playback output from the tape recorder circuitry which would normally be connected by way of playback output line 156 through switch 72 to line 120, since relay 40 is energized during playback. The connection from line 156 through contact 72 and lines 116 and 120 is interrupted by the opening of contact 118 during the pause mode.

The final contact on the pause switch 150 is movable contact 158 which connects a pause warning light 160 across the power supply during the pause mode.

As illustrated in FIG. 3, the recorder/receiver unit may be connected to a suitable power source 162 which may be 110 volt, 60 cycle alternating current, or may be a suitable DC voltage, depending upon the nature of the use of the present system. The power source is connected by way of lines 164 and 166 to the clock mechanism 168 and to the radio power supply 170 for operation of the clock radio portion of the system in conventional manner. The power source is also connected by way of lines 172 and 174 to the control circuitry described above.

To operate the system of FIG. 3, the selector switch 98 is shifted to its third contact 106 to connect the auxiliary receiver output through lines 108, 112, switch contact 72, line 116, switch contact 118 and line 120 to the audio amplifier 90, so that the auxiliary receiver may be tuned to a desired broadcast frequency. The switch 98 may then be shifted back to one of the other receiver units 80 or 82, as desired, for normal listening to the radio. The output of the auxiliary receiver, is connected by way of line 122 to the record input of the tape recorder 124 so that when the auxiliary receiver is on, its output will be fed to the record circuitry of the tape recorder. The tape recorder may then be operated without in any way affecting or interrupting the use of the clock radio portion of the system; the clock radio may be used to listen to background music or the like or it may even be turned off. The auxiliary receiver remains on, however (or if desired may be operated by means of timer 66 to be normally off but turned on at selected times), and the tape recorder is operated periodically to record the selected programs. With the system as shown, the timer 66 will operate periodically to close contact 60, thereby energizing the tape recorder motor. Activation of the tape recorder will in turn close tape switch 54 which will then remain closed until the tape has played through its continuous loop, thereby holding the tape recorder motor on until the loop has completed its travel. In the meantime, the timer 66 again opens contact 60.

The timer is activated, for example, once each hour to turn the tape recorder on, to receive and record the hourly news broadcast. If desired, the timer 66 may be used to also turn on the auxiliary receiver with the receiver remaining on for the same five-minute time duration as the tape recorder.

In order to listen to any previously recorded information, such as a news broadcast, it is only necessary to activate the momentary playback switch 32, to momentarily close switch contact arms 30 and 44. Switch arm 44 completes the circuit from the power source through line 48 to the tape recorder motor, turning the unit on and causing the tape switch 54 to close. The closure of switch arm 30 supplies power to the solenoid 38 of control relay 40, switching shift contact arms 68, 72 and 74 from their record mode (as shown) to their playback mode. The closure of switches 54 and 68 seals in the relay 38 by way of lines 70 and 36, and holds the system in the playback mode, even after switch 32 is released. The shifting of tape recorder switches 74 shifts the recorder to the playback mode while the operation of contact 72 connects the playback output 156 from the tape recorder to the audio amplifier 90. The system remains in its playback mode until it reaches the end of the tape loop, at which time switch 54 opens, releasing solenoid 38 and causing control relay 40 to shift back to the record mode. This disconnects the output of the tape recorder from the audio amplifier and reconnects the selector switch 98 to amplifier 90 so that the background programming is restored.

If it is desired to listen to the programming being received by the auxiliary receiver during a time when the unit is recording, the playback switch 32 is not operated, for that would interrupt the recording sequence, would shift the system to its playback mode, and would cause the previously recorded information, not the currently received information to be played back. When the system is recording, as will be indicated by recording lamp 144 being on, it is only necessary to shift switch 98 to its contact 106 to select the auxiliary receiver. During the record mode of the system, such a shift would connect the output of the auxiliary receiver through line 112, switch contact 72, line 116, switch contact 118 and line 120 to the output of the audio amplifier 90. This would allow the user to listen to the material being received at the same time that it is being recorded. After the completion of the recording, the system can be shifted to the playback mode to listen to the earlier part of the programming which might have been missed.

If it is desired to stop a playback sequence, it is only necessary to momentarily open stop switch 146, as has been described. This will shift the system out of the playback mode back to the record mode. Similarly, if it is desired to temporarily interrupt a playback operation it is only necessary to depress the pause switch 150, thereby shifting switch contacts 152, 118, 154 and 158, opening the tape recorder motor circuit and connecting the output from selector switch 98 directly to the audio amplifier 90. This is done without disturbing the energization of relay 40, and thus without removing the tape recorder from its playback mode. A second operation of the pause switch 150 restores the switch contacts 152, 118, 154 and 158 to their illustrated positions and allows the playback to continue to the end, at which time the tape switch 54 will open and de-energize relay 40.

Although the present invention has been described in terms of a preferred embodiment, it will be understood that numerous variations and modifications can be made without departing from the inventive concepts. Thus, for example, although the system has been illustrated in terms of mechanical switching arrangements for convenience of illustrations, it will be understood that various solid-state devices may be substituted, in the manner well-known in the art. Accordingly, the timer mechanism 60 may be a solid-state timer which operates a complementary solid-state switch to activate the system. In similar manner various other substitutions of solid-state switching for the illustrated mechanical switching will be apparent to those of skill in the art. Again, the conventional radio receiver and tape recorder elements have been shown diagrammatically for simplicity in describing the inventive concept, and it will be apparent that various conventional features of such systems are contemplated. Thus, for example, it would be expected that the output of the tape recorder playback circuitry would be blocked until the recorder motor reaches full speed; the various selector switches may include illuminated indicators; and additional switching may be provided for the relay 40 where required for a particular tape recorder application. Although the system has been described in terms of a tape loop having a five-minute recording segment, tapes of various lengths may be used without departing from the inventive concepts. The timer 66 may, of course, be operated at more frequent intervals than once per hour and the exact time it operates will be dependent upon the broadcast events to be received. However, these variations and modifications are all within the skill of the art and their use would not involve a departure from the true spirit and scope of the invention as defined by the following claims.

What is claimed is:

1. A broadcast receiver/recorder system for periodically receiving and recording selected broadcast events, comprising:
   a radio receiver having an output;
   a tape recorder having record and playback modes, a record input and a playback output, said tape recorder normally being in its record mode;
   audio output means;
   means connecting said receiver output to said record input of said tape recorder;
   timer means for selectively and periodically activating said tape recorder to record selected periodic events;
   first control means for selectively shifting said tape recorder from its record mode to its playback mode and for connecting said playback output to said audio output means; and
   second control means responsive to said tape recorder for holding said tape recorder in its playback mode for a preselected time period and for thereafter shifting said recorder back to its record mode, whereby said recorder is activated by said timer means periodically to record each of said selected events, and is selectively activated by said first control means to play back said selected events.

2. The system of claim 1 wherein said second control means responsive to said tape recorder includes a continuous loop recording tape of preselected length, and tape controlled switch means responsive to said recording tape.

3. The system of claim 1, further including stop means for returning said tape recorder to its record mode before the end of said preselected time period.

4. The system of claim 1, further including pause switch means for interrupting the operation of said tape recorder during its playback mode without returning said recorder to its record mode.

5. The system of claim 1, wherein said means for shifting said tape recorder from its record mode to its playback mode includes playback switching means operable to activate said tape recorder.

6. The system of claim 1, wherein said means for shifting said tape recorder from its record mode to its playback mode includes:
   first playback switch means operable to activate said tape recorder;
   second playback switch means; and
   a mode shifting switch responsive to operation of said second playback switch means to shift to a playback mode to connect said playback output to said audio output means and to shift said tape recorder to its playback mode.

7. The system of claim 6, wherein said first and second playback switch means are momentary, and wherein said second control means includes tape controlled switch means responsive to activation of said tape recorder to hold said tape recorder on for a predetermined time period and to hold said mode shifting switch in its playback mode for said predetermined time period.

8. The system of claim 7 wherein said first and second playback switch means comprise switch contact arms of a double-pole switch, and wherein said mode shifting switch comprises solenoid-controlled relay switch contacts.

9. The system of claim 1, wherein said receiver and said tape recorder comprise a unitary, self-contained, portable unit.

10. The system of claim 9, wherein said receiver and said recorder are connected in combination with a primary receiver, whereby said receiver is auxiliary to said primary receiver, the combination further including:
    selected switch means connected to said audio output means for selectively connecting said primary receiver or said auxiliary receiver to said output means; and
    means for disconnecting said selector switch means from said audio output means and for connecting the playback output of said tape recorder to said audio output means.

11. The system of claim 10, further including pause means for interrupting the operation of said tape recorder during its playback mode without returning said recorder to its record mode and for reconnecting said selector switch means to said audio output means.

12. The system of claim 1, wherein said second control means is further responsive to activation of said tape recorder by said timer means to maintain operation of said tape recorder in a record mode for a predetermined period of time to record a selected event of predetermined time duration.

13. The system of claim 1, wherein said second control means includes a continuous loop recording tape of preselected length, and tape controlled switch means responsive to said tape, whereby events having a time duration corresponding to the length of said tape are periodically recorded and previously recorded events are erased, whereby only the most recently recorded one of said selected periodic events is played back upon shifting of said tape recorder to its playback mode.

* * * * *